US012626366B2

(12) United States Patent
Qin et al.

(10) Patent No.: US 12,626,366 B2
(45) Date of Patent: May 12, 2026

(54) AUTOMATED IMAGE SEGMENTATION SYSTEM AND METHOD

(71) Applicant: The Hong Kong Polytechnic University, Hong Kong (CN)

(72) Inventors: Jing Qin, Hong Kong (CN); Youyi Song, Hong Kong (CN)

(73) Assignee: The Hong Kong Polytechnic University, Hong Kong (CN)

( * ) Notice: Subject to any disclaimer, the term of this patent is extended or adjusted under 35 U.S.C. 154(b) by 335 days.

(21) Appl. No.: 18/351,190

(22) Filed: Jul. 12, 2023

(65) Prior Publication Data

US 2024/0394887 A1      Nov. 28, 2024

(30) Foreign Application Priority Data

May 26, 2023    (CN) .......................... 202310609875.0

(51) Int. Cl.
G06T 7/11 (2017.01)

(52) U.S. Cl.
CPC ...... G06T 7/11 (2017.01); G06T 2207/10081 (2013.01); G06T 2207/20081 (2013.01)

(58) Field of Classification Search
CPC ............. G06T 7/11; G06T 2207/10081; G06T 2207/20081; G06T 2207/20084; G06V 10/26; G06V 10/82; G06N 3/0464; G06N 3/08
See application file for complete search history.

(56) References Cited

U.S. PATENT DOCUMENTS

| | | | | |
|---|---|---|---|---|
| 10,373,317 B1 * | 8/2019 | Kim | .................... | G06F 18/2148 |
| 11,048,977 B1 * | 6/2021 | Ulbricht | ................. | G06V 10/98 |
| 11,087,883 B1 * | 8/2021 | Narayanan | ............. | G16H 30/20 |
| 11,403,763 B2 * | 8/2022 | Chen | ......................... | G06T 7/11 |
| 2019/0205620 A1 * | 7/2019 | Yi | ......................... | G06V 40/172 |

(Continued)

FOREIGN PATENT DOCUMENTS

| | | | | |
|---|---|---|---|---|
| CN | 108319938 A | * | 7/2018 | ........... G06V 10/774 |

OTHER PUBLICATIONS

Song et al., "Selective Learning from External Data for CT Image Segmentation", LNCS, vol. 12901, International Conference on Medical Image Computing and Computer Assisted Intervention, Sep. 27-Oct. 1, 2021, Strasbourg, France, pp. 420-430.

*Primary Examiner* — Mia M Thomas

(74) *Attorney, Agent, or Firm* — Dority & Manning, PA

(57) ABSTRACT

A method of training a learning network to perform image segmentation includes receiving training data from a trusted source and an alternative source; assigning weights to data in the second corpus; dividing the data into batches with samples from the first and second corpuses; and completing training epochs by, for each batch: generating an output for each sample; determining a loss by comparing the generated output with a ground truth for each sample; defining a discrepancy for each second corpus sample as a difference between the sample loss and the average loss for the first corpus, approximated as the average loss for the first corpus from the preceding epoch modified by a change in the average loss from the preceding to the current epoch; identifying weights for the next batch which minimise the weighted sum of discrepancies and network parameters which minimise the average weighted loss.

15 Claims, 6 Drawing Sheets

(56)  References Cited

U.S. PATENT DOCUMENTS

| | | | |
|---|---|---|---|
| 2023/0245431 A1* | 8/2023 | Ianni .................... | G06N 3/0464 |
| | | | 382/128 |
| 2024/0153644 A1* | 5/2024 | Crawford ................. | G06T 7/62 |
| 2025/0225776 A1* | 7/2025 | Zhang ................... | G06V 20/64 |

* cited by examiner

1

AUTOMATED IMAGE SEGMENTATION SYSTEM AND METHOD

FIELD OF THE DISCLOSURE

The present disclosure relates to an image segmentation system and method, especially suitable for analysing medical images.

BACKGROUND OF THE DISCLOSURE

Image segmentation is a method of dividing a digital image into segments which can be further processed or analysed. Computer assisted volumetric image segmentation of medical images is a particularly challenging type of image segmentation. Typically, computer assisted image segmentation supports the daily work of radiologists who visually analyse anatomical structures in medical images and discern subtle variations in size shape and structure which may be indicative of a disease state of a subject.

A typical approach in training machine learning based (deep neural network) image segmentation of medical images lies in the use of a large internal dataset of images (e.g. Computer Tomography or CT images) which have voxel level annotation of target structures performed by domain experts such as radiologists. It would be appreciated that preparation of this internal training data is laborious and time consuming; and may even require multiple rounds of consultation between experts to reach a consensus.

Supplementation of such internal data with external data comprising CT images sourced from websites or other institutions is possible. However, this is complicated by variation in image quality and relevance, and difficulty in discerning between useful and harmful data from such images. One solution would be to drop external data of such images with a large loss value during training but this would distort machine learning by favouring easy to learn patterns; ignoring informative data with useful hard patterns that make deep models more accurate and robust. At the same time, it would be appreciated that if external data with a large loss value is not dropped then associated learning may be inappropriately affected by hard patterns from outliers.

Various approaches have been utilised to learn external data weights including by using gradient descent detection of mini-batch data; however such approaches are computationally expensive; as they require computation of second order gradients of the network.

It is an object of the present disclosure to address or at least partially ameliorate some of the above problems of the current approaches.

SUMMARY OF THE DISCLOSURE

Features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims.

In accordance with a first aspect of the present disclosure, there is provided a computer-implemented method of training a learning network to perform image segmentation, the method comprising: receiving a first corpus of training data from a trusted source; receiving a second corpus of training data from at least one alternative source; assigning an initial weight to each item of data in the second corpus; dividing the training data into one or more batches, where each batch includes at least one sample from the first corpus and at least one sample from the second corpus; and completing a predefined number of training epochs, wherein each training epoch comprises, for each batch: generating an output for each sample in the batch using the learning network; determining a loss value for each sample in the batch by comparing the generated output with a ground truth for the sample; defining a discrepancy for each second corpus sample in the batch as a difference between the loss value for the sample and the average loss for all first corpus samples, wherein the average loss for all first corpus samples is approximated as the average loss for all first corpus samples from the preceding training epoch modified by a change in the average loss for first corpus samples in the batch from the preceding training epoch to the current training epoch; identifying a set of updated weights for the next batch which minimise the weighted sum of the discrepancies for each second corpus sample; identifying updated network parameters for the learning network which minimise the average loss for each first corpus sample in the batch and the average weighted loss for each second corpus sample in the batch.

The method may include training the learning network using the first corpus of training data to obtain a first optimum network, wherein network parameters are identified for each batch subject to a first constraint that the average loss for each first corpus sample in the batch must be less than the average loss for each first corpus sample processed by the first optimum network.

The network parameters may be identified by gradient descent using the sum of weighted losses for the batch and a first constraint term representing the first constraint.

The first constraint term may be determined by: comparing the loss value for each first corpus sample in the batch with the loss value for the sample when processed by the first optimum network; and for the one or more loss values for a first corpus sample in the batch which are greater than the corresponding loss values for the samples when processed by the first optimum network, summing the differences between the compared loss values to generate the first constraint term.

The first constraint term may be modified by a penalty coefficient which is initiated at a small value and updated to increase with each batch.

The penalty coefficient may be updated to increase by a value based on the first constraint term for the batch.

The penalty coefficient may be weighted to reduce gradually after a predetermined number of epochs have been completed.

Network parameters may be identified for each batch subject to a second constraint that the sum of the weights is non-zero.

The identified set of updated weights may minimise the weighted sum of the discrepancies in combination with a factor based on the scalar length of a vector formed by the plurality of weights.

The discrepancy for each second corpus sample may be further multiplied by the difference between the loss value for the sample in the current epoch and the loss value for the sample in the previous epoch.

Each sample may be a computed tomography, CT, scan.

The average loss for all first corpus samples may be set as 1 in the first epoch.

In accordance with a second aspect of the present disclosure, there is provided a computer-implemented method of performing image segmentation, the method comprising: training a learning network to perform image segmentation by receiving a first corpus of training data from a trusted source; receiving a second corpus of training data from at least one alternative source; assigning an initial weight to each item of data in the second corpus; dividing the training data into one or more batches, where each batch includes at least one sample from the first corpus and at least one sample from the second corpus; and completing a predefined number of training epochs, wherein each training epoch comprises, for each batch: generating an output for each sample in the batch using the learning network; determining a loss value for each sample in the batch by comparing the generated output with a ground truth for the sample; defining a discrepancy for each second corpus sample in the batch as a difference between the loss value for the sample and the average loss for all first corpus samples, wherein the average loss for all first corpus samples is approximated as the average loss for all first corpus samples from the preceding training epoch modified by a change in the average loss for first corpus samples in the batch from the preceding training epoch to the current training epoch; identifying a set of updated weights for the next batch which minimise the weighted sum of the discrepancies for each second corpus sample; identifying updated network parameters for the learning network which minimise the average loss for each first corpus sample in the batch and the average weighted loss for each second corpus sample in the batch; receiving one or more samples of image data; and generating an output of segmented image data for each received sample.

In accordance with a third aspect of the present disclosure, there is provided a computer-readable medium comprising instructions which, when executed by a processor, cause the processor to train a learning network to perform image segmentation by receiving a first corpus of training data from a trusted source; receiving a second corpus of training data from at least one alternative source; assigning an initial weight to each item of data in the second corpus; dividing the training data into one or more batches, where each batch includes at least one sample from the first corpus and at least one sample from the second corpus; and completing a predefined number of training epochs, wherein each training epoch comprises, for each batch: generating an output for each sample in the batch using the learning network; determining a loss value for each sample in the batch by comparing the generated output with a ground truth for the sample; defining a discrepancy for each second corpus sample in the batch as a difference between the loss value for the sample and the average loss for all first corpus samples, wherein the average loss for all first corpus samples is approximated as the average loss for all first corpus samples from the preceding training epoch modified by a change in the average loss for first corpus samples in the batch from the preceding training epoch to the current training epoch; identifying a set of updated weights for the next batch which minimise the weighted sum of the discrepancies for each second corpus sample; identifying updated network parameters for the learning network which minimise the average loss for each first corpus sample in the batch and the average weighted loss for each second corpus sample in the batch.

In accordance with a fourth aspect of the present disclosure, there is provided a image segmentation network, trained by receiving a first corpus of training data from a trusted source; receiving a second corpus of training data from at least one alternative source; assigning an initial weight to each item of data in the second corpus; dividing the training data into one or more batches, where each batch includes at least one sample from the first corpus and at least one sample from the second corpus; and completing a predefined number of training epochs, wherein each training epoch comprises, for each batch: generating an output for each sample in the batch using the learning network; determining a loss value for each sample in the batch by comparing the generated output with a ground truth for the sample; defining a discrepancy for each second corpus sample in the batch as a difference between the loss value for the sample and the average loss for all first corpus samples, wherein the average loss for all first corpus samples is approximated as the average loss for all first corpus samples from the preceding training epoch modified by a change in the average loss for first corpus samples in the batch from the preceding training epoch to the current training epoch; identifying a set of updated weights for the next batch which minimise the weighted sum of the discrepancies for each second corpus sample; identifying updated network parameters for the learning network which minimise the average loss for each first corpus sample in the batch and the average weighted loss for each second corpus sample in the batch.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended Figures. Understanding that these Figures depict only exemplary embodiments of the disclosure and are not therefore to be considered to be limiting of its scope, the principles herein are described and explained with additional specificity and detail through the use of the accompanying Figures.

Preferred embodiments of the present disclosure will be explained in further detail below by way of examples and with reference to the accompanying Figures, in which.

DETAILED DESCRIPTION OF THE PREFERRED EMBODIMENTS

Various embodiments of the disclosure are discussed in detail below. While specific implementations are discussed, it should be understood that this is done for illustration purposes only. A person skilled in the relevant art will recognize that other components and configurations may be used without departing from the spirit and scope of the disclosure.

A data-efficient training algorithm for deep neural networks enables the segmentation of medical images by effective discernment from external data by assigning large importance weights to the 'good' external data and small importance weights to 'bad' data. ('Good' and 'bad' data references data which will improve and degrade the learning performance during training, respectively.)

By optimizing the weighted loss function, the 'good' external data contributes more to the network updating and enables the network to mine more valuable knowledge, and at the same time the network is suppressed from memorizing irrelevant patterns of 'useless' or 'harmful' data, facilitating the maximization of performance gain from using external data.

This data discernment mechanism is a constrained non-linear programming problem, where the segmentation network is constrained to learn better with the external data, jointly learning the importance weights and the network to maximize associated complementary benefits.

The present disclosure teaches solving this discernment problem by employing the block coordinate descent optimization scheme which alternatively performs importance weight estimation and constrained network updating. The importance weights are estimated based on the distribution discrepancy between the external data and the internal data, and the network is updated with the weighted loss and the translated hard constraints.

Figure 1:
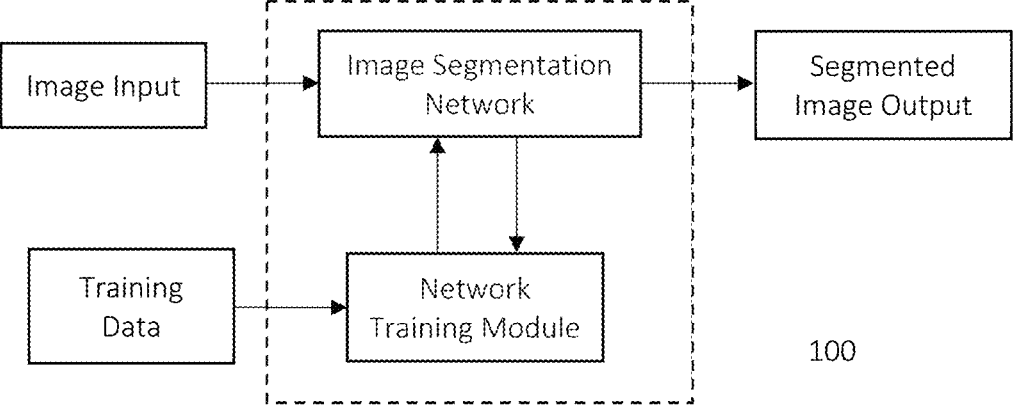
FIG. 1 shows an image processing apparatus according to an embodiment.

FIG. 1 shows an image processing apparatus according to an embodiment. The image processing apparatus comprises an image segmentation network and a network training module.

The image segmentation network is configured to receive one or more samples of image data. In some examples, each sample is a computed tomography, CT, scan. In some examples, the image data may include microscopy images, MRI scans, X-ray images, photographs, video image frames, or any other image data.

The image segmentation network is configured to generate an output of segmented image data for each received sample. The image segmentation network may be an encoder-decoder network. The image segmentation network may have a UNet architecture, or a SegNet, CANet, LadderNet, U-Net with attention, recurrent and residual convolutional U-Net (R2-UNet), U-Net with residual blocks or any other suitable network architecture.

The network training module is configured to train the image segmentation network. In some examples, the network training module may be configured to first train the learning network using the first corpus of training data to obtain a first optimum network.

Figure 2:
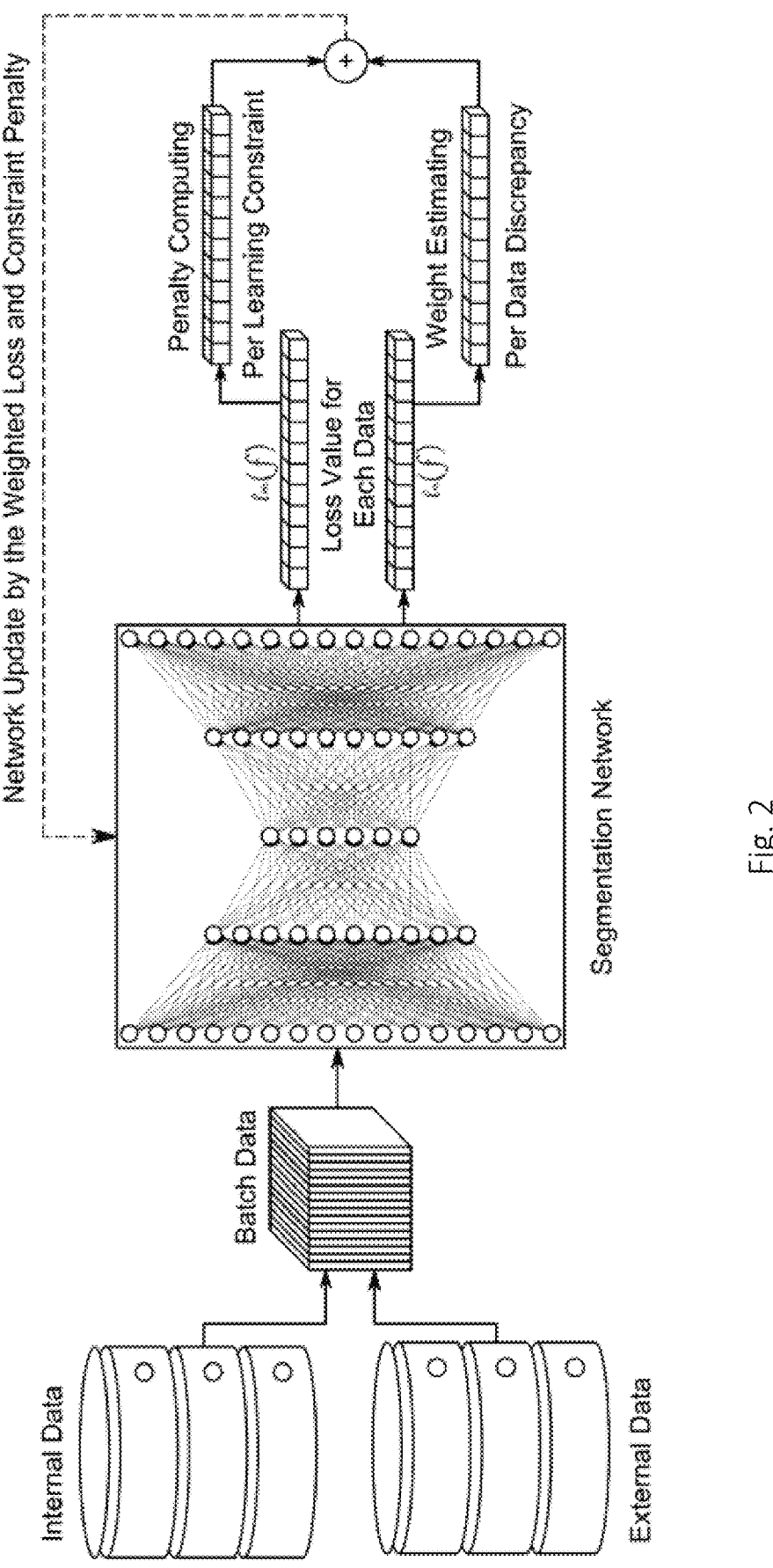
FIG. 2 shows a network training process according to an embodiment.

FIG. 2 shows a network training process according to an embodiment.

The network training module is configured to receive a first corpus of training data from a trusted source. The first corpus of training data may be referred to as internal data. The first corpus includes a plurality of samples. Each sample may include pixel-wise or voxel-wise annotations. In some examples, data from a trusted source may be manually annotated, in some examples, with multiple rounds of annotation to reach a consensus among experts.

The network training module is configured to receive a second corpus of training data from at least one alternative source. The second corpus of training data may be referred to as external data. The second corpus includes a plurality of samples. In some examples, data from an alternative source may be shared on websites or by academic institutions. In some examples, the image quality and relevance may be variable, as well as the completeness and accuracy of annotations.

The network training module is configured to assign an initial weight to each item of data in the second corpus.

The network training module may be configured to determine an importance weight for each external data sample as set out below so that the weighted empirical expectation, $$\frac{1}{K}\sum_{k=1}^{K} w_k \ell(f(x_k), y_k),$$

is an unbiased estimation of the expectation, $\mathbb{E}_{(x,y)\sim\mathcal{D}}$ $[\ell(f(x),y)]$.

In the above expressions, K is the size of training data, $w_k$ is the importance weight of data-pair $(x_k, y_k)$, $\ell$ denotes the loss function for training, f stands for the network, and $\mathcal{D}$ is the underlying data distribution that can accurately reflect the segmentation task.

In some examples, the loss function may be based on Dice loss, average surface detection or any other suitable metric for boundary detection and/or image segmentation.

The network training module is configured to divide the training data into one or more batches. Each batch includes at least one sample from the first corpus and at least one sample from the second corpus.

The network training module is configured to complete a predefined number of training epochs to jointly learning the importance weights and the network parameters. The training may be formulated as a constrained nonlinear programming problem, letting $$\{x_m, y_m\}_{m=1}^{M} \text{ and } \{x_n, y_n\}_{n=1}^{N}$$

represent the internal and external datasets with number of samples M and N, respectively, the problem may be expressed as:

$$\underset{\substack{f\in\mathcal{F}, \\ w\in[0,1]^N}}{\operatorname{argmin}}\left(\frac{1}{N}\sum_{n=1}^{N}w_n\ell_n(f) + \frac{1}{M}\sum_{m=1}^{M}\ell_m(f)\right)$$

In the above expression, $\mathcal{F}$ is the admissible function space of the network f and $w \triangleq (w_1, \ldots, w_n)^T$. The symbol $\ell_i(f)$ may represent $\ell(f(x_i),y_i)$ or simplicity.

Each training epoch comprises the following steps performed by the network training module for each batch:

First, the network training module is configured to generate an output for each sample in the batch using the learning network.

Then, the network training module is configured to determine a loss value for each sample in the batch by comparing the generated output with a ground truth for the sample.

Next, the network training module is configured to define a discrepancy for each second corpus sample in the batch as a difference between the loss value for the sample and the average loss for all first corpus samples.

That is, for the data distribution $\mathcal{D}_n$ from which the external data $(x_n, y_n)$ was sampled and the distribution $\mathcal{D}$ for the internal dataset, the network training module is configured to define a discrepancy $d(\mathcal{D}_n, \mathcal{D}|f^{(t)})$ between $\mathcal{D}_n$ and $\mathcal{D}$ measured at the iteration step t as $|\ell_n(f^{(t)}) - \bar{\ell}_{[M]}(f^{(t)})|$, where $\bar{\ell}_{[M]}(f^{(t)})$ stands for the average of $\ell_m(f^{(t)})$ on the internal dataset. In this way, the discrepancy d is small when the network performs similarly on the external data $(x_n, y_n)$ and internal dataset, while being large when performing differently.

The network training module is configured to approximate the average loss for all first corpus samples as the average loss for all first corpus samples from the preceding training epoch modified by a change in the average loss for first corpus samples in the batch from the preceding training epoch to the current training epoch. That is, the network training module is configured to estimate $\bar{\ell}_{[M]}(f^{(t)})$ as $\bar{\ell}_{[M]}(f)-(\bar{\ell}_{[M_b]}(f)-\bar{\ell}_{[M_b]}(f^{(t)}))$, where $\bar{\ell}_{[M]}(f)$ is the average of the loss value of the internal data during the last training epoch, and $M_b$ denotes the data batch for the estimation at the current training iteration.

In some examples, the network training module may be configured to set the average loss for all first corpus samples as 1 in the first epoch.

In some examples, the network training module may be configured to multiply the discrepancy for each second corpus sample by the difference between the loss value for the sample in the current epoch and the loss value for the sample in the previous epoch. That is, the network training module can alleviate the randomness in the discrepancy by revising d ($\mathcal{D}_n$, $\mathcal{D}|f^{(t)}$) as $(|\ell_n(f^{(t)})-\ell_{[M]}(f^{(t)})\cdot(\ell_n(f)-\ell_n(f^{(t)}))|$.

In this way, the network training module can consider the loss trajectory of the external data from the last epoch to now, in order to correct the estimation bias. A large $\ell_n(f^{(t)})$ will not result in a large $x_n$ if it is difficult to segment, because in that case $\ell_n(f)-\ell_n(f^{(t)})$ is usually small, and vice versa.

Next, the network training module is configured to identify a set of updated weights for the next batch which minimise the weighted sum of the discrepancies for each second corpus sample.

The network training module may determine the importance weight for each external data by solving the below problem:

$$w^{(t+1)} \in \underset{w>0}{\operatorname{argmin}}\left(\frac{1}{N}\sum_{n=1}^{N} w_n d\left(\mathcal{D}_n, \mathcal{D} \mid f^{(t)}\right) + \lambda w^T w\right)$$

In the above expression, t denotes the iteration step and d($\mathcal{D}_n$, $\mathcal{D}|f^{(t)}$) stands for the discrepancy. The first term aims at assigning a large importance weight $w_n$ to the data if the discrepancy value is small.

In some examples, the identified set of updated weights minimises the weighted sum of the discrepancies in combination with a factor based on the scalar length of a vector formed by the plurality of weights. That is, the second term $w^T w$ in the expression above. In this way, the network training module can regularise the weights, aiming at assigning a similar weight to all external data for encouraging the network to learn from as many external data as possible. The hyperparameter $\lambda>0$ may be used to balance the contributions of the two terms to the estimation.

Finally, the network training module is configured to identify updated network parameters for the learning network which minimise the average loss for each first corpus sample in the batch and the average weighted loss for each second corpus sample in the batch. That is, the network training module is configured to solve the below problem:

$$\underset{\substack{f\in\mathcal{F},\\ w\in[0,1]^N}}{\operatorname{argmin}}\left(\frac{1}{N}\sum_{n=1}^{N} w_n\ell_n(f) + \frac{1}{M}\sum_{m=1}^{M}\ell_m(f)\right)$$

Advantageously, the block coordinate descent optimization solution alternatively estimates the importance weights for external data and updates the network.

This approach effectively reduces the burden on data collection for using deep neural networks in medical image segmentation tasks by exploiting external data which was previously of low use; but at the same time is not inappropriately affected by this external data. Advantageously, the proposed approach is computationally efficient as it uses the learning trajectory to estimate the importance weights. It does not require the second order gradients of the network, which greatly reduces the computational cost and speeding up the training.

More specifically, instead of evaluating $\bar{\ell}_{[M]}(f^{(t)})$, which is computationally expensive, or and simply using, $\ell_n(f^{(t)})$, which brings a strong randomness, the network training module can use the learning trajectory to resolve this crux, thereby using the loss change on a data batch $M_b$ to approximate the loss change on the whole internal dataset M. The network training module can use a data batch $M_b$ plus a trajectory vector with the size of M for the evaluation, largely reducing the computational cost.

In some examples, the network training module may be configured to identify network parameters for each batch subject to a first constraint that the average loss for each first corpus sample in the batch must be less than the average loss for each first corpus sample processed by the first optimum network.

The first constraint may be expressed as $$\frac{1}{M}\sum_{m=1}^{M}\ell_m(f) \le \frac{1}{M}\sum_{m=1}^{M}\ell_m(\hat{f}_M^*),$$

where $$\hat{f}_M^*$$

represents the optimum of the network trained on the internal data only. In this way, the network training module can ensure that the image segmentation network learns better using external data than using internal data only.

In some examples, the network training module may be configured to identify network parameters for each batch subject to a second constraint that the sum of the weights is non-zero.

The second constraint may be expressed as $1^T w>0$. In this way, the network training module can prevent degenerate solutions of w, e.g., w=0.

In some examples, the network training module may be configured to identify the network parameters by gradient descent using the sum of weighted losses for the batch and a first constraint term representing the first constraint. That is, the network training module may be configured to update the segmentation network $f^{(t+1)}$ by calculating:

$$f^{(t)} - \gamma^{(t)}\nabla\left(\sum_{i=1}^{b} w_i^{(t+1)}\ell_i(f^{(t)}) + \xi^{(t)}C(f^{(t)})\right),$$

In the above expression, $\gamma^{(t)}$ and b denote the learning rate and the batch size respectively. The internal and external data may be randomly mixed in each batch, and so $w_i^{(t+1)} \triangleq 1$ for the internal data. In the last term, the first constraint term is represented by $\mathcal{C}\,(\mathbf{f}^{(t)})$, with a penalty coefficient $\xi^{(t)}$.

In some examples, the network training module may be configured to determine the first constraint term by comparing the loss value for each first corpus sample in the batch with the loss value for the sample when processed by the first optimum network. For the one or more loss values for a first corpus sample in the batch which are greater than the corresponding loss values for the samples when processed by the first optimum network, the network training module may be configured to sum the differences between the compared loss values to generate the first constraint term.

That is, the network training module may be configured to define $\mathcal{C}\,(\mathbf{f}^{(t)})$ as $$\sum\nolimits_{i\in[M]}\max(\ell_i(f^{(t)}) - \ell_i(\hat{f}_M^*), 0).$$

This expression has a value of 0 when each $$\ell_m(f^{(t)}) < \ell_m(\hat{f}_M^*)$$

and a positive value otherwise. It does not affect the network updating when all $$\ell_m(f^{(t)}) < \ell_m(\hat{f}_M^*),$$

while when there are any violations it will force the network to primarily eliminate the violations. Consequently, it makes the network have a smaller $\ell_m(\mathbf{f}^{(t)})$ than $$\ell_m(\hat{f}_M^*),$$

which will guarantee the first constraint. To see this, note that $$\ell_m(f^{(t)}) \le \ell_m(\hat{f}_M^*), \forall\, m \in [M],$$

gives the result:

$$\sum\nolimits_{m=1}^M \ell_m(f^{(t)}) \le \sum\nolimits_{m=1}^M \ell_m(\hat{f}_M^*).$$

In some examples, the network training module may be configured to modify the first constraint term by a penalty coefficient. The network training module may be configured to initiate the penalty coefficient at a small value and update the penalty coefficient to increase with each batch.

In some examples, the network training module may be configured to update the penalty coefficient to increase by a value based on the first constraint term for the batch.

For example, the network training module may be configured to update the penalty coefficient as $$\xi^{(t+1)} \leftarrow \xi^{(t)} + \gamma_\xi^{(t)} \mathcal{C}(f^{(t)}),$$

where $$\gamma_\xi^{(t)}$$

denotes the updating rate. This updating rule may be derived by using sub-gradients, as $\mathcal{C}\,(\mathbf{f}^{(t)})$ is non-differentiable. In some examples, the network training module may be configured to weight the penalty coefficient to reduce gradually after a predetermined number of epochs have been completed.

For example, the network training module may be configured to weight $\xi^{(t)}\mathcal{C}\,(\mathbf{f}^{(t)})$ by a factor as $$0.5 \cdot \left(1 + \cos\left(\frac{e_i - e_a}{e - e_a}\pi\right)\right)$$

to anneal its contribution to the network updating after $e_\alpha$-th epoch, where $e_i$ and $e$ are the $e_i$-th epoch and the total epochs.

By annealing the constraint penalty in the network update at the late stage, the network training module can avoid making $\xi^{(t)}\mathcal{C}\,(\mathbf{f}^{(t)})$ large for violations at the late epochs in the training, which can cause the network has to sacrifice its segmentation accuracy to eliminate the violations. In this way, the network training module can allow the network to focus on the performance improvement not just eliminate violations.

Figure 3:
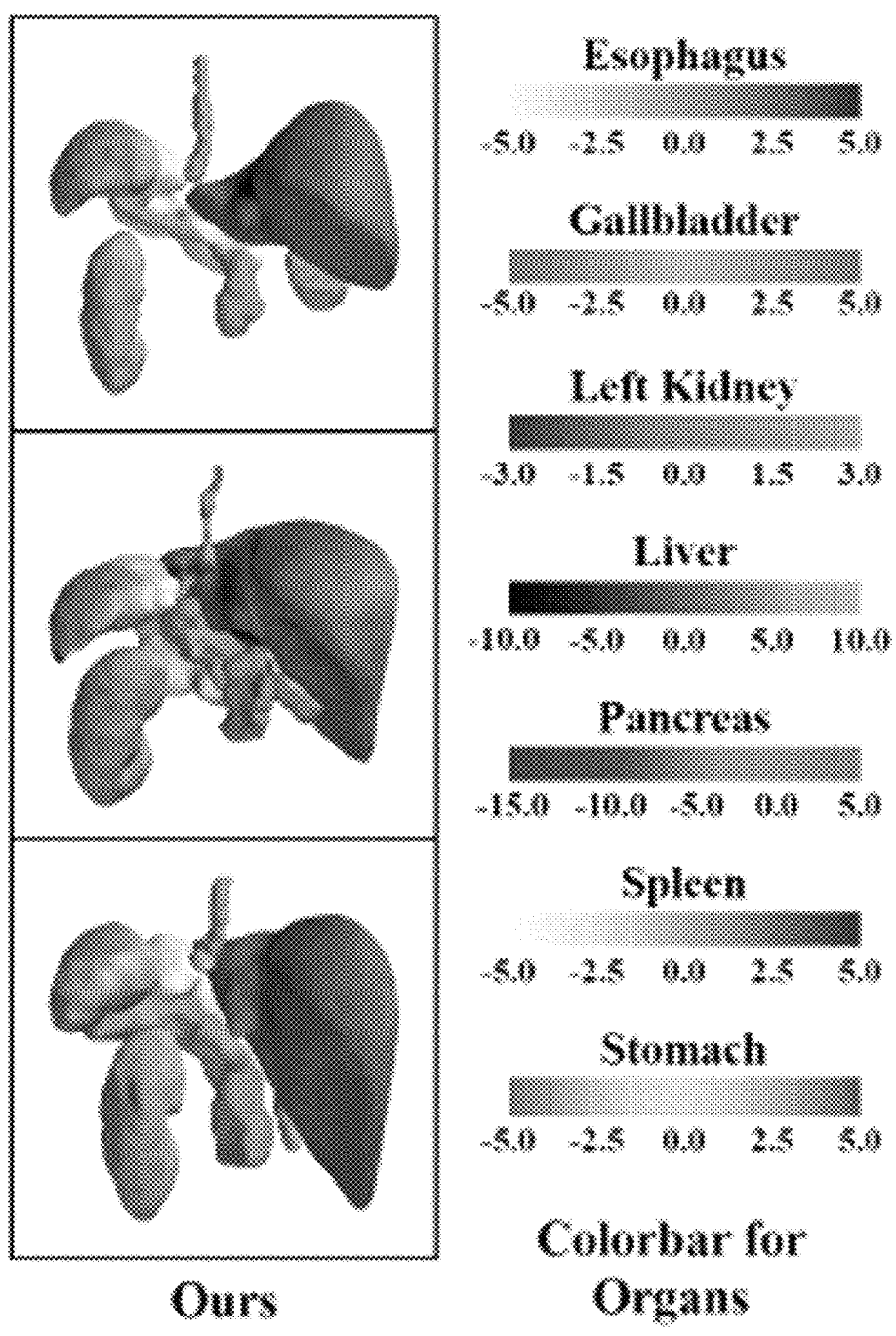
FIG. 3 shows an exemplary image segmentation output.

FIG. 3 shows an exemplary image segmentation output for multi-organ segmentation based on an input CT scan. The results of segmentation for 7 organs are shown for three examples. The results were produced using all external data. The colour information in the figure reflects the distance of the boundary pixels of the segmentation result to the nearest boundary pixels of the ground truth. The distance is measured by the L1 norm of pixels' coordinates that has been converted into the original image size.

Figure 4:
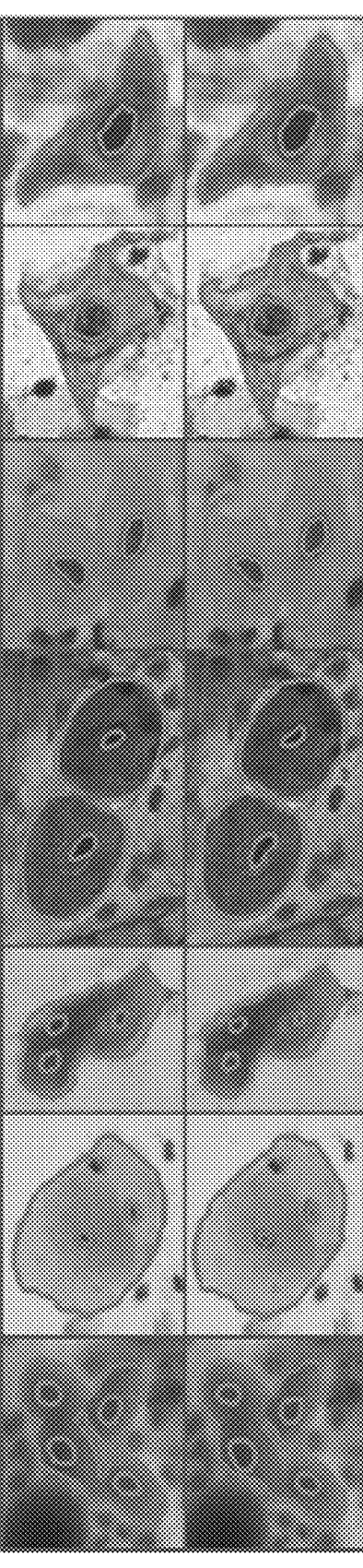
FIG. 4 shows an exemplary image segmentation output.

FIG. 4 shows an exemplary image segmentation output for cervical cell segmentation based on an input microscopy image. The results for segmenting the cytoplasm and nucleus are shown for seven examples. The results were produced using all external data. The results of the algorithm output are shown on the right against the ground truth on the left.

The method of the embodiment was compared the proposed invention against four methods for the multi-organ segmentation task. The methods include a data selection-based method (DS), two data weighting-based methods (RW and DD), and a preliminary version of our method (SL). DS selects k data with the smallest loss value from the batch at each iteration to update the network; k is set to 5 here. RW assigns data weights by minimizing the weighted loss on the validation set; we used 50% of the given internal training data for this. Note that DD and our method both use the distribution discrepancy to assign the importance weight for external data. However, DD assumes that all external data in the same dataset are sampled from the same distribution, and so assigns a same importance weight for all external data in the same dataset, while our method looks for a suitable importance weight for each external data, as external data in the same dataset can be sampled from different distributions. We implemented them to reproduce their results by using the same learning settings as ours.

Figure 5:
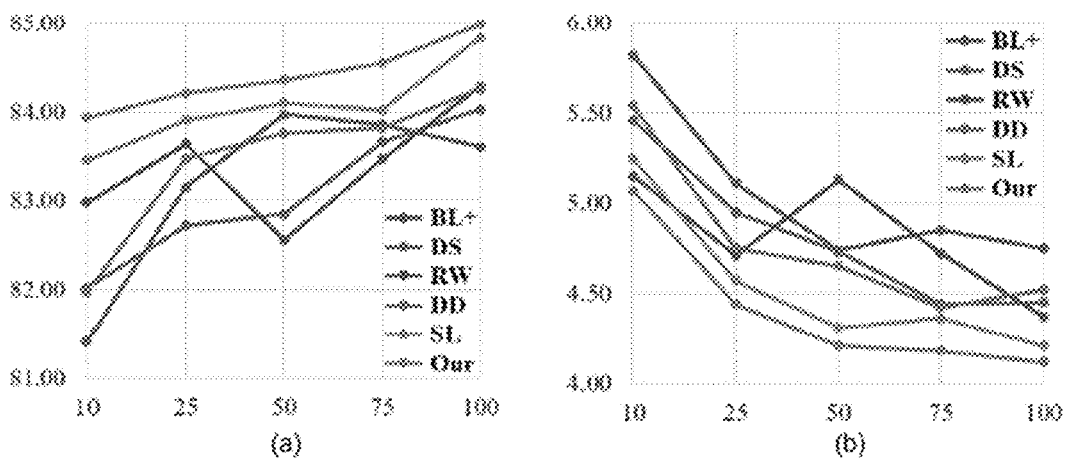
FIG. 5 shows an exemplary performance assessment of the image processing apparatus.

FIG. 5 shows an exemplary performance assessment of the image processing apparatus for the multi-organ segmentation task. The results are shown for the segmentation of the 7 organs shown in FIG. 3. FIG. 5(*a*) shows a Dice loss coefficient (DSC) as a percentage, calculated against the ground truth. FIG. 5(*b*) shows the average surface distance (ASD) measure in pixels against the ground truth. Both sets of results are generated for 5 amounts of external data used: 10%, 25%, 50%, 75%, and 100%. We employed a UNet as the backbone network and trained using Dice loss to generate loss values. We can see that our algorithm produced a more accurate result in all scenarios and that it is the only method producing a better result when more external data are given. These findings suggest that our algorithm discerns external data more effectively than the compared methods and that its discernment ability is affected less by the amount of external data.

We also compared the methods for cervical cell segmentation. We used the same experimental setting to reproduce their results. We compared them for segmenting the cytoplasm and nucleus under 5 amounts of external data used: 10%, 25%, 50%, 75%, and 100%.

Figure 6:
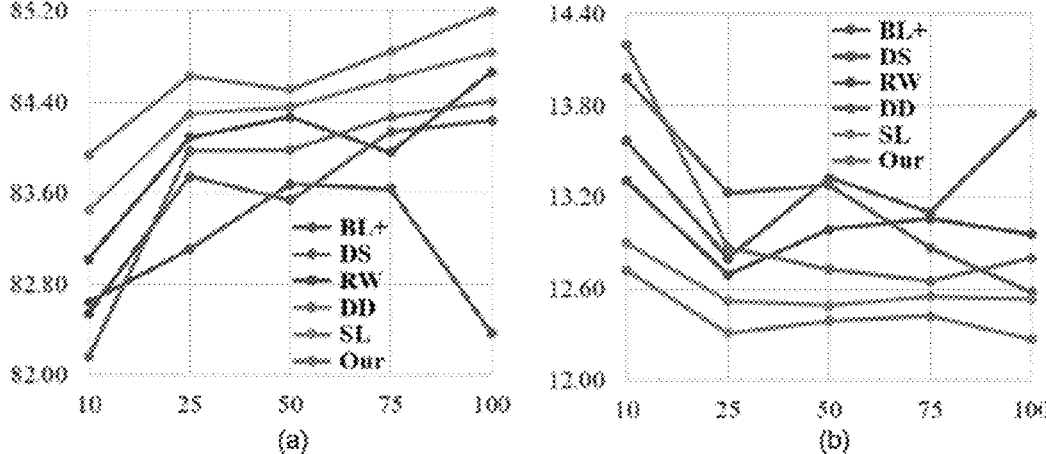
FIG. 6 shows an exemplary performance assessment of the image processing apparatus.

FIG. 6 shows an exemplary performance assessment of the image processing apparatus for the cervical cell segmentation task. FIG. 6(*a*) shows a Dice loss coefficient (DSC) as a percentage, calculated against the ground truth. FIG. 6(*b*) shows the average surface distance (ASD) measure in pixels against the ground truth. Both sets of results are generated for 5 amounts of external data used: 10%, 25%, 50%, 75%, and 100%. The results are produced by the UNet with Dice loss. We can see that our algorithm produced more accurate results than the compared methods under all scenarios, confirming that it can work well in different types of medical image segmentation tasks, being able to effectively discern different types of medical images.

Figure 7:
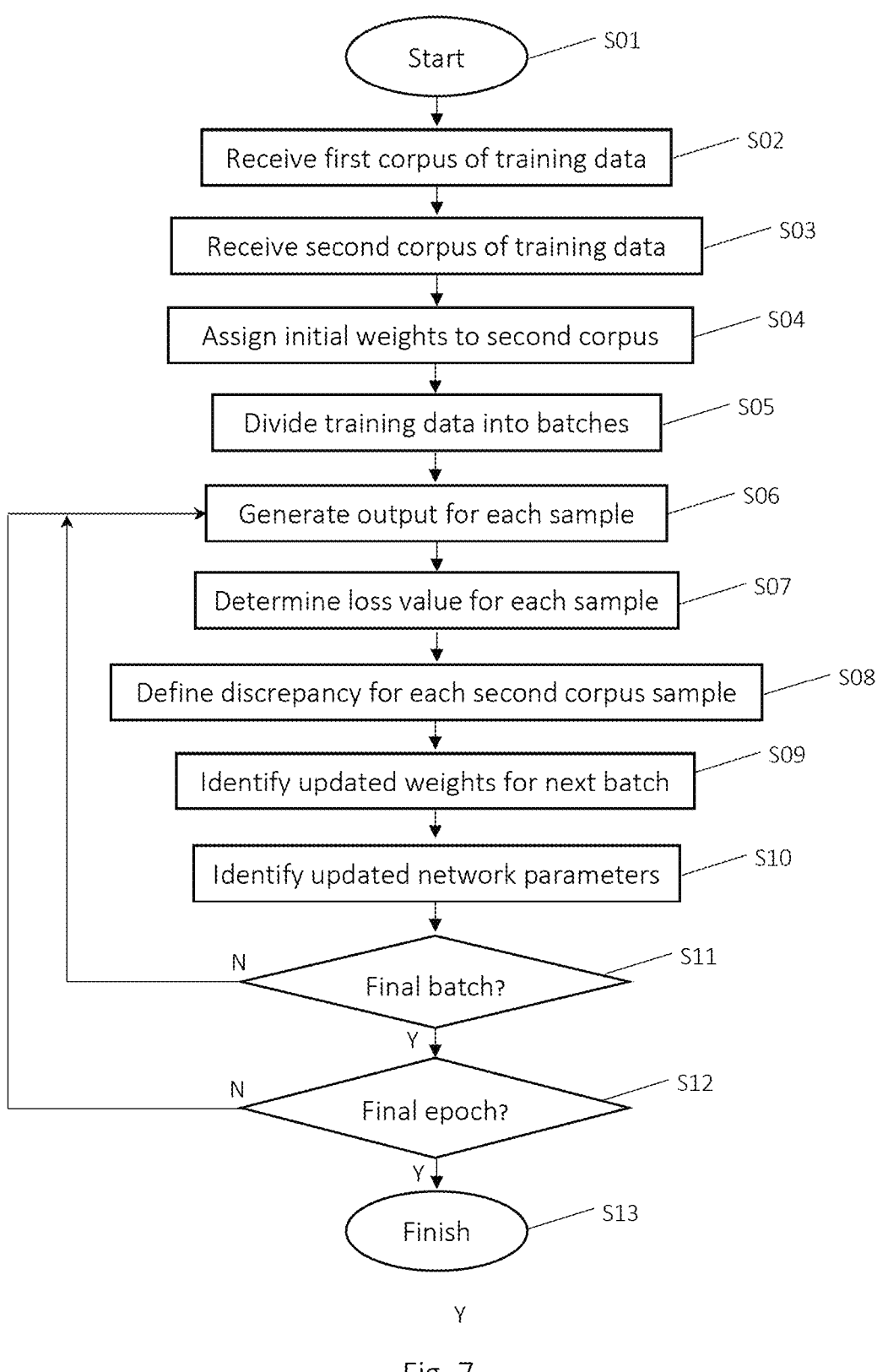
FIG. 7 shows a method of training an image segmentation network according to an embodiment.

FIG. 7 shows a method of training an image segmentation network according to an embodiment. The method starts at step S01.

At step S02, a first corpus of training data is received from a trusted source.

At step S03, a second corpus of training data is received from at least one alternative source.

At step S04, an initial weight is assigned to each item of data in the second corpus.

At step S05, the training data is divided into one or more batches, where each batch includes at least one sample from the first corpus and at least one sample from the second corpus.

At step S06, starting with the first batch, an output is generated for each sample in the batch using the learning network.

At step S07, a loss value is determined for each sample in the batch by comparing the generated output with a ground truth for the sample.

At step S08, a discrepancy is defined for each second corpus sample in the batch as a difference between the loss value for the sample and the average loss for all first corpus samples, wherein the average loss for all first corpus samples is approximated as the average loss for all first corpus samples from the preceding training epoch modified by a change in the average loss for first corpus samples in the batch from the preceding training epoch to the current training epoch.

At step S09, a set of updated weights which minimise the weighted sum of the discrepancies for each second corpus sample is identified for the next batch.

At step S10, updated network parameters are identified for the learning network which minimise the average loss for each first corpus sample in the batch and the average weighted loss for each second corpus sample in the batch.

At step S11, it is determined if the batch is the final batch in the one or more batches generated at step S05. If yes, the method proceeds to step S12. Otherwise, the method returns to step S06 with the next batch.

At step S12, it is determined if the batch is the final epoch in a predetermined number of epochs. If yes, the method proceeds to step S13. Otherwise, the method returns to step S06 with the first batch of the next epoch.

The method finishes at step S13.

The above embodiments are described by way of example only. Many variations are possible without departing from the scope of the disclosure as defined in the appended claims.

For clarity of explanation, in some instances the present technology may be presented as including individual functional blocks including functional blocks comprising devices, device components, steps or routines in a method embodied in software, or combinations of hardware and software.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, Universal Serial Bus (USB) devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer-implemented method of training a learning network to perform image segmentation, the method comprising:

receiving a first corpus of training data from a trusted source;

receiving a second corpus of training data from at least one alternative source;

assigning an initial weight to each item of data in the second corpus;

dividing the training data into one or more batches, where each batch includes at least one sample from the first corpus and at least one sample from the second corpus; and completing a predefined number of training epochs, wherein each training epoch comprises, for each batch:

generating an output for each sample in the batch using the learning network;

determining a loss value for each sample in the batch by comparing the generated output with a ground truth for the sample;

defining a discrepancy for each second corpus sample in the batch as a difference between the loss value for the sample and the average loss for all first corpus samples, wherein the average loss for all first corpus samples is approximated as the average loss for all first corpus samples from the preceding training epoch modified by a change in the average loss for first corpus samples in the batch from the preceding training epoch to the current training epoch;

identifying a set of updated weights for the next batch which minimise the weighted sum of the discrepancies for each second corpus sample; and identifying updated network parameters for the learning network which minimise the average loss for each first corpus sample in the batch and the average weighted loss for each second corpus sample in the batch.

2. The computer-implemented method of claim 1, further comprising training the learning network using the first corpus of training data to obtain a first optimum network, wherein network parameters are identified for each batch subject to a first constraint that the average loss for each first corpus sample in the batch must be less than the average loss for each first corpus sample processed by the first optimum network.

3. The computer-implemented method of claim 2, wherein the network parameters are identified by gradient descent using the sum of weighted losses for the batch and a first constraint term representing the first constraint.

4. The computer-implemented method of claim 3, wherein the first constraint term is determined by:

comparing the loss value for each first corpus sample in the batch with the loss value for the sample when processed by the first optimum network; and for the one or more loss values for a first corpus sample in the batch which are greater than the corresponding loss values for the samples when processed by the first optimum network, summing the differences between the compared loss values to generate the first constraint term.

5. The computer-implemented method of claim 4, wherein the first constraint term is modified by a penalty coefficient which is initiated at a small value and updated to increase with each batch.

6. The computer-implemented method of claim 5, wherein the penalty coefficient is updated to increase by a value based on the first constraint term for the batch.

7. The computer-implemented method of claim 5, wherein the penalty coefficient is weighted to reduce gradually after a predetermined number of epochs have been completed.

8. The computer-implemented method of claim 1, wherein network parameters are identified for each batch subject to a second constraint that the sum of the weights is non-zero.

9. The computer-implemented method of claim 1, wherein the identified set of updated weights minimises the weighted sum of the discrepancies in combination with a factor based on the scalar length of a vector formed by the plurality of weights.

10. The computer-implemented method of claim 1, wherein the discrepancy for each second corpus sample is further multiplied by the difference between the loss value for the sample in the current epoch and the loss value for the sample in the previous epoch.

11. The computer-implemented method of claim 1, wherein each sample is a computed tomography, CT, scan.

12. The computer-implemented method of claim 1, wherein the average loss for all first corpus samples is set as 1 in the first epoch.

13. The computer-implemented method of claim 1, further comprising performing image segmentation by:

receiving one or more samples of image data; and generating an output of segmented image data for each received sample.

14. A non-transitory computer-readable medium comprising instructions which, when executed by a processor, cause the processor to execute the method of claim 1.

15. An image segmentation network, trained according to the method of claim 1.

* * * * *